March 29, 1949.   G. L. DIMMICK   2,465,713
METHOD OF PRODUCING HARDENED OPTICAL COATINGS
BY ELECTRON BOMBARDMENT
Filed March 29, 1946   2 Sheets-Sheet 1

Inventor
Glenn L. Dimmick
By C. D. Dusha
Attorney

Inventor
Glenn L. Dimmick
Attorney

Patented Mar. 29, 1949

2,465,713

UNITED STATES PATENT OFFICE 2,465,713

METHOD OF PRODUCING HARDENED OPTICAL COATINGS BY ELECTRON BOMBARDMENT

Glenn L. Dimmick, Indianapolis, Ind., assignor to Radio Corporation of America, a corporation of Delaware Application March 29, 1946, Serial No. 657,973
In Great Britain June 28, 1945

17 Claims. (Cl. 117—106)

This invention relates to thin coats on optical surfaces and to a method and apparatus for improving the hardness or toughness and durability of light-transparent coatings deposited upon surfaces of optical articles by thermal evaporation. This is a continuation in part of my application Serial No. 533,526, filed May 1, 1944, and now Patent No. 2,428,868.

An object of the invention is to provide a light-transparent film on the surface of an optical object, characterized by substantially improved hardness and durability.

Another object of the invention is to substantially improve the hardness, durability and chemical stability of a thermally evaporated film on a surface of an optical article without deleteriously affecting said article, as by thermal effects.

Another object of the invention is to provide an improved process for treating a film having reflection reducing characteristics on an optical surface to make the film more compact, resistant to abrasion and to the action of certain solvents such as distilled water.

Still another object of the invention is to produce a thin protective coating of improved hardness and durability on front surface optical mirrors, without deleteriously affecting the optical properties of the mirror.

Further additional objects and advantages not heretofore specified will become apparent from the following detailed description.

Referring to the drawings.

In accordance with the invention, the hardness, toughness, durability and chemical stability of a thermally evaporated film on an optical article is substantially improved, without deleteriously affecting the optical or physical characteristics of said article, by treating said film, preferably magnesium fluoride, $MgF_2$, with an electrical discharge, preferably electron bombardment, during or after the thermal evaporation process in vacuo. The coating or film is hardened by bombardment with electrical particles, a term used to include molecules, atoms, ions, or electrons which make the coating more dense and compact. Subsequently the coating is treated to close the pores to render it water resistant and permanently hard and durable.

Heretofore, such coatings have been hardened by means of baking at high temperatures after removing the article from the bell jar or by means of the application of radiant heat in the bell jar prior to the film-forming process. While these processes have substantially improved the durable characteristics of the film, the heat involved has been a problem in regard to the optical body, particularly cemented duplex lenses. The heating has set up objectionable strains in high precision optical bodies. Furthermore, the time required for heating and cooling such bodies has slowed production. According to the present invention, the film is treated in such a manner as to substantially improve the hardness and durability of the film without deleteriously affecting the cement between doublet lenses and without producing strains of such magnitude as to harm precision optical bodies.

It has been observed that when most materials having a lower index of refraction than about 1.5 are evaporated onto glass in a vacuum at room temperature, the reflectivity reaches a minimum value which is somewhat lower than is realized after air containing moisture is allowed to fill the bell jar. For instance, when magnesium fluoride is evaporated onto spectacle crown glass at room temperatures, the minimum reflectivity is about 15 per cent of its former value. When moist air is let into the jar, the reflectivity rises to about 30 per cent. It may be that the evaporated material does not deposit in a dense structure but is somewhat porous, and when moisture is allowed to come into contact with the evaporated film, molecules of water are attracted into these pores and thus the index of refraction is increased. One disadvantage of forming the evaporated film as described above is that it is deleteriously affected by water. For example, when a drop of distilled water is allowed to dry on its surface, the film beneath the drop is softened to the point where it is easily wiped off. This is probably a result of external water being attracted to the molecules of water which are inside the film, causing the structure to break up.

It has been discovered that when magnesium fluoride is evaporated onto glass raised to a temperature of about 200° C. in a vacuum, the resulting film is much harder and is not appreciably affected by water at room temperature. It was observed that films of magnesium fluoride on spectacle crown glass, made in this way, reached a minimum reflectivity of about 30% of their former value and that the reflectivity did not change when moist air was allowed to enter the bell jar. It was observed also that when drops of distilled water were allowed to dry on the above films, they did not affect the hardness of the film. It is believed that this increased durability results from an action wherein the high temperature of the glass causes the molecules of magnesium fluoride to have a random motion much higher than at room temperature, thus allowing the molecules to form a denser film structure.

Although the above method, as heretofore proposed and used, is a satisfactory one for producing a durable magnesium fluoride film, there is considerable objection to it because of the fact that the glass must be heated to such a high temperature. This makes it impractical to coat cemented doublets, and tends to produce harmful strains in the glass. In some experiments leading to the present invention it was found possible to improve the durability of an evaporated film, without the use of such heat, by increasing the velocity of the molecules of evaporated material. If these molecules are considerably increased in velocity, they will have a greater impact upon the glass and upon the previously evaporated molecules, and will cause the structure to become more dense. In accordance with the foregoing experiment, magnesium fluoride molecules which had thus been increased in velocity were allowed to strike a plate of glass and to build a film $\lambda/4$ in thickness. Films made in this way were tested for water solubility and found to be more resistant than films made in the normal way at room temperature.

Although the above increased velocity method gave some improvement in the durability of magnesium fluoride films, it soon became apparent that it did not offer a complete solution to the problem. Experiments were made also with ionic bombardment. A magnesium fluoride film was bombarded with ionized gas molecules by allowing a small amount of air to enter the bell jar following the deposition of the film by thermal evaporation, and applying a high voltage between two electrodes in the jar. While ionic and molecular bombardment improved film durability, it was found that electron bombardment offered a further improvement. Electrons can be emitted and controlled in a vacuum and a considerable amount of kinetic energy can be directed to the glass or film surface. The problem was one of producing a sufficient quantity of electrons in the bell jar at a pressure of from .1 to .2 microns and directing these onto the glass to be coated. After many experiments with different types of cathodes and different shaped anodes, an electron gun, shown in Figure 2, was built and used in an arrangement shown in Figure 1 for testing the effect of electron bombardment upon films such as evaporated magnesium fluoride.

Figures 1, 2, 3, 4, 5, 6, 7:
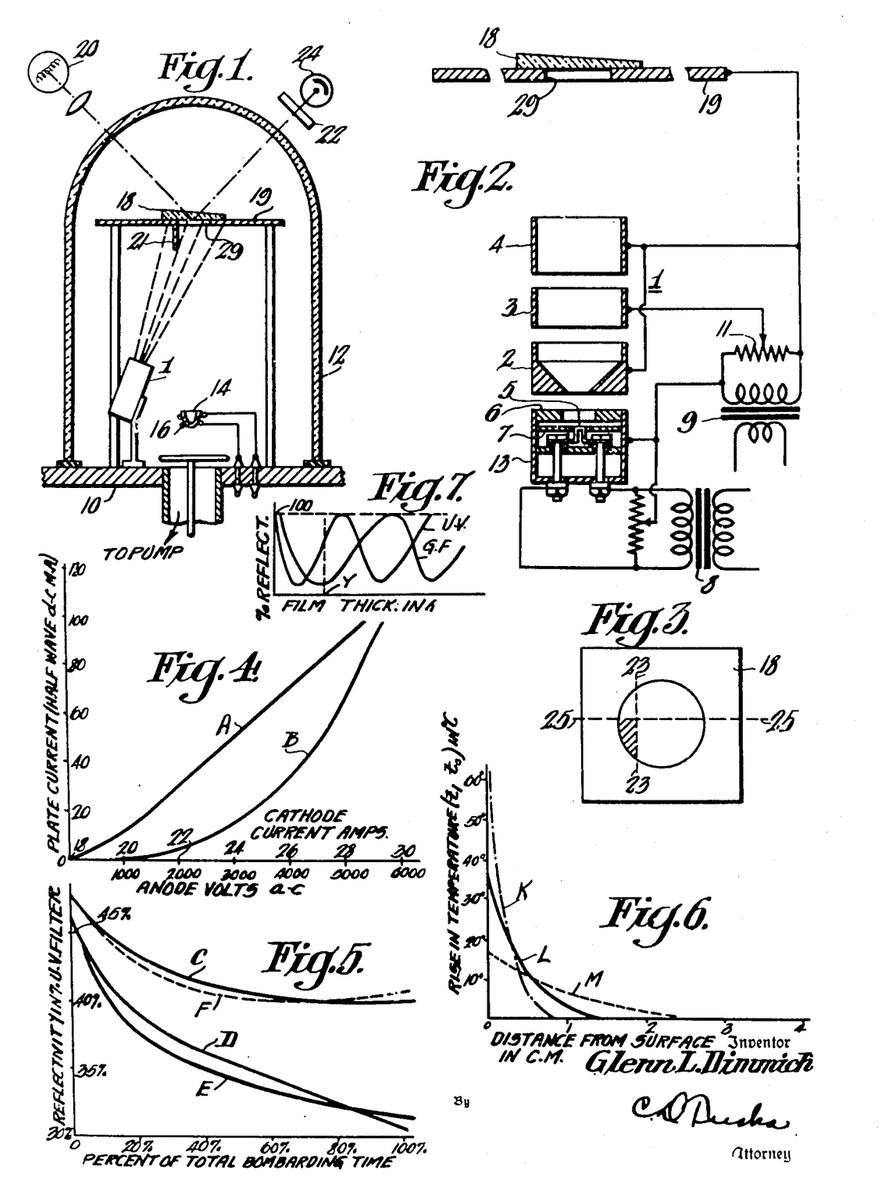
Figure 1 is a side elevation view of a bell jar and enclosed apparatus embodying the invention.
Figure 2 is a schematic view, partly in section, of certain of the apparatus shown in Figure 1 and including a diagram of the electrical circuit.
Figure 3 is a plan view of an optical object treated in accordance with the invention.
Figures 4, 5, 6, and 7 are characteristic curves involving the apparatus in accordance with the invention.

In Figure 2, the electron gun 1 comprises a tantalum cathode 5 made of pure tantalum ribbon .005" thick by .090" wide. A rectangular cathode surface 0.125" x .090" forms the electron emitter. A molybdenum disc 7, centrally apertured, surrounds but does not touch the rectangular portion of the cathode. A circular metallic disc 6, 1/16" thick, includes a central aperture 3/8" in diameter. This acts as an electron condenser and causes the electrons leaving the cathode to form a slightly diverging bundle. The cylindrical electrodes 2 and 4 are first and second anodes, respectively, which are .9" in diameter. The anode 2 has a circular opening 1/16" in diameter in the end nearest the cathode 5; a bundle of electrons passes through the opening without striking the edges. The cylindrical electrode 3 is a focusing electrode which is kept at a desired potential between that of the anodes 2 or 4 and the cathode 5, by means of a potentiometer 11. The three cylindrical electrodes 2, 3, and 4 form an electrostatic lens, the focal length of which depends upon the voltages applied. The first anode 2 is spaced about 1/8" from the nearest face of the apertured plate 6. A transformer 8 supplies current to heat the cathode. The transformer 9 applies to the anodes 2, 3, and 4 the high voltage which accelerates the electrons. The high potential terminal is also connected to the metal support plate 19 as a target anode, although a separate electrode near the optical element 18 may be used. For the tests, A.-C. voltages from 2,000 volts to 6,000 volts were used. While the electron gun is shown about full size, the support plate 19 diameter and its distance from the gun are larger than shown, as indicated by broken lines. The electron gun acts as a half-wave rectifier and projects a beam of electrons, preferably perpendicularly, to the lens plate during each half cycle. The electrode structures 6 and 7 are connected through shell 13 to an intermediate point on the circuit energizing the cathode, and to the low potential side of the high voltage secondary of transformer 9.

Figure 4 shows curves A of anode current vs. anode volts and B of anode current vs. cathode current for the electron gun shown in Figure 1. Curve A was taken by holding the cathode current at 28.5 amperes and varying the anode voltage. Curve B was taken by holding the anode voltage at 5,000 volts A.-C. and varying the cathode current.

Referring to Figure 1, the electron gun 1 described above was mounted on base 10 in position for use in a vacuum formed by a bell jar 12 and the base 10. Tests were made to determine the effect of bombarding a magnesium fluoride film with electrons during evaporation from a boat or cup 14. The vacuum in the bell jar was brought to about .1 micron by means of a vacuum pump, not shown. Ionization apparatus, not shown, may be included. The magnesium fluoride was evaporated from a seamless molybdenum cup 14 wound with molybdenum wire 16 insulated with an Alundum cement. The coating, deposited upon an optical wedge 18, was controlled by observing the light beam from source 20 reflected from the lower surface to be coated through a filter 22, into a photocell and electron multiplier 24. The current from the electron multiplier was read on an ultra-sensitive D.-C. meter. The meter was set to read 100 per cent (full scale) for the light from the uncoated glass surface. The electrons from the gun were focused to a spot about 1" in diameter on the optical article or glass wedge 18 through opening 29 in plate 19. The voltage on the anode was 4,000 volts A. C. and the cathode current was 62 milliamperes, rectified A. C. Magnesium fluoride was evaporated on the glass at a rate such as to require about 1.5 minutes for a ¼ wavelength film. During the evaporation, the glass and film were bombarded for one second every sixth second. The total bombarding time was, therefore, fifteen seconds. The reflectivity dropped from 100 per cent to a minimum of 35 per cent during the evaporation and bombardment. When air was let into the jar, the reflection rose to 37 per cent. Upon inspection of the film it appeared to have a non-uniform brown deposit over the surface. This absorbed some of the incident light and appeared bright and metallic by reflection. When the glass alone was bombarded with electrons there was no deposit. Apparently the electron bombardment caused a portion of the magnesium fluoride to decompose, leaving metallic magnesium on the surface of the film.

During the next test, magnesium fluoride was evaporated on the glass until the reflection was minimum and then it was bombarded for one second every fifteen seconds for twelve times. The spot size, the anode voltage and the electron current were the same as in the first experiment. The minimum reflectivity was 18 per cent before the bombardment started. As the bombardment progressed, the reflectivity dropped to 15 per cent and then rose to 40 per cent. When the air was let in, the reading remained at 40 per cent. Before the film was bombarded it was normal in color and free from absorption. As it was bombarded, a brownish deposit appeared in spots which seemed to be at the most intense part of the beam. When it was taken from the jar, shortly after the bombardment, the glass was just barely warm.

By inspecting the last film, it was apparent that some areas where the intensity of the electron beam was below some definite value, the material had not decomposed and the film was clear and transparent. Drops of distilled water were placed on the film in areas where the magnesium fluoride had not decomposed and also in areas where it had. It was allowed to dry and then tested. In the areas where the intensity had been just below that required for decomposition, the water drops had almost no effect on the film. An extremely fine line was apparent at the edge of each drop, but no appreciable amount of material came off. This represents a major improvement over normal magnesium fluoride films evaporated at room temperature and not bombarded. Such films are removed completely in the areas covered by distilled water drops when these drops are allowed to dry. By placing distilled water drops over areas which had been decomposed, it was observed that the film was less durable and part of it came off in the water. Further tests showed that electronic bombardment, either during evaporation or after film had been deposited and in the same vacuum, resulted in a major improvement in hardness. The hardness was also found to be greatest for electron intensities just under the value required for decomposition of the magnesium fluoride.

Having thus proved that electronic bombardment increases the mechanical durability and decreases the action of water on magnesium fluoride films, tests were made to determine how this effect varies with voltage, current, time, temperature, etc. The A.-C. transformer 9 of Figure 1 was replaced by a D.-C. power supply capable of delivering voltages from 500 volts to 7,000 volts, and capable of delivering current as high as ½ ampere.

In order to make reliable comparisons between bombarded and unbombarded films of magnesium fluoride, the arrangement shown in Figure 1 was adopted. Wedges 18 made of spectacle crown glass were placed successively over a circular hole in plate 19 in different tests. A vertical mask or vane 21 shielded a portion of the glass from the electron stream projected from the gun 1, casting an electron shadow as shown in Figure 3 to left of line 23—23. The complete circular surface portion of glass exposed by the hole in plate 19 was visible from the evaporating boat 14 and was therefore coated with a uniform layer of magnesium fluoride. After removing the wedges from the jar, the coated surfaces were rubbed with oil-tanned chamois skin.

In order to test for improvement in water resistance, the wedge was placed in distilled water to a level about half the height of the wedge, as shown by broken line 25—25 and left in the water for 24 hours. It was found that the shaded area (not bombarded) to left of line 23—23 and below line 25—25, came off in the water in about an hour, while the rest of the film was still in good condition. To test for hardness, a pencil eraser was rubbed across the upper coated portion of the wedge above line 25—25 shown in Figure 3. The bombarded and unbombarded areas were given the same treatment by passing the eraser across the line of demarcation 23—23. It was found that the unbombarded area above 25—25 to left of line 23—23 scratched and eventually rubbed off with the eraser, while the bombarded area was so hard that it was not eroded or scratched by the eraser.

It was observed from the first test wedges that bombarding of magnesium fluoride films with electrons reduced the thickness of the films. This is easy to detect because the color of the bombarded area as observed by the eye is different from the unbombarded area, the shift being in the direction of the red end of the spectrum. Thus, when the wedge shown in Figure 3 is observed when taken from the jar in Figure 1, the segment to left of 23—23 would normally be blue-purple by reflection and the right side segment would be red-purple. This change in color provides a means of measuring the amount of compacting of the film produced by bombardment after evaporation, but in the same vacuum.

Since starting the development in connection with the invention, I have made it the practice to rub the surface of electronically bombarded films with an ordinary oil-tanned chamois skin within a few minutes of the time that these films are taken from the bell jar. The original purpose for doing this was to eliminate the condition of abnormally high surface friction which exists on newly evaporated films of most materials. This condition of high surface friction is even greater in the case of electronically bombarded magnesium fluoride films.

Tests were made to determine the importance of this operation upon the hardness and solubility of magnesium fluoride films. To do this, I coated and bombarded two glass samples. One of these was rubbed in the normal way with a chamois, while the other remained untouched. The samples were allowed to lie for twenty-four hours under ordinary conditions of room temperature and normal humidity. The films were then tested for hardness with the aid of a red Eberhard Faber eraser. Much to my surprise, the untreated film had become relatively soft, whereas, the film which was rubbed with the chamois was just as hard as when it was taken from the jar. The same test was made several times to be sure that the results could be repeated. All of the tests led to the same conclusion. It seems apparent that the above tests clearly show the importance of closing the pores of a bombarded film after the film has been removed from the vacuum. Although magnesium fluoride is relatively insoluble in water, it is quite easy to show that the material has a great attraction for water. In the case of the unbombarded film, water vapor is immediately attracted into the film the instant it is allowed to come in contact with moist air. In the case of electronically bombarded films, the structure is made so compact as to prevent the immediate entrance of water into it. However, if the pores are not closed, the force of attraction for water molecules is great enough to gradually force the structure apart and permit the entrance of water. Once the pores of the newly bombarded surface have been closed, it is practically impossible to open them again by rubbing or washing the surface or by using cleaning solvents, and the films remain hard indefinitely.

Tests were made to determine whether rubbing the surface with a perfectly clean, dry chamois would produce the desired results. We have tried this test, and the results were negative. When a freshly coated and bombarded surface is taken from the bell jar, it has a very high coefficient of friction. When this is rubbed with an oil-tanned chamois, the friction quickly decreases to a small fraction of its original value. About two or three strokes is all that is necessary to accomplish this result. However, if the chamois is carefully cleaned to eliminate oil and organic matter, the friction does not decrease appreciably when the surface is rubbed several times. This indicates that the reduction in friction accomplished when using an oil-tanned chamois is a convenient way of detecting when the pores have been filled up to the point where the surface is lubricated by the extremely thin layer of oil or other organic material.

A few tests were made to determine whether or not there is a better method than the chamois treatment for conditioning the surface of bombarded films. On one sample, the surface was treated with stearic acid dissolved in benzine. On another sample, the surface was treated with lanum wax dissolved in carbon tetrachloride. In each case the excess material was washed off the surface and the surface was dried with a clean cotton cloth. This treatment proved effective in closing the pores. A third sample was treated with a chamois in the normal way. The sample treated with the chamois was at least as hard if not slightly harder than the two others. Any of these treatments gives satisfactory results, although the chamois skin treatment has the advantage of indicating to the operator, by a noticeable reduction in friction during rubbing, when the pores have been closed. This treatment leaves no excess film on the surface.

Referring to the arrangement shown in Figure 1, an ultra-violet filter 22 is placed in front of the photo-cell and electron multipler. The film of magnesium fluoride is evaporated to such thickness as to reflect minimum green light. But when using an ultra-violet filter (3,650 A.) the reflectivity drops during evaporation from 100 per cent of its former value down to about 14 per cent, and then rises to about 50 per cent, at which time the evaporation is stopped. Under this condition, any slight change in film thickness is easily detected by the measuring equipment because it is operating on the side of a steep curve of reflection vs. film thickness, for ultra-violet light as shown in Figure 7 point Y. Curve UV was made with an ultra-violet filter while curve GF was made with a green filter. The reflectivity was found to drop from 50 per cent to as low as 30 per cent during electron bombardment of the film. This is definite proof that bombardment produces a more compact structure. It was observed also that when a normal unbombarded film of magnesium fluoride is brought into contact with air containing moisture, the reflectivity rises from 50 per cent to 68 per cent. This indicates that moisture is attracted into the porous structure of a normal film and causes it to swell, thus increasing its thickness, reducing its mechanical strength, and increasing its solubility in water.

By using the method described above, it was possible to study the effect of changing various factors in the bombarding process. For instance, the bombarding time was varied over a range from eight minutes down to one-quarter second, keeping the product of intensity and time constant for each test. Readings of reflectivity were taken at various intervals during the bombarding process for each test. Figure 5 shows the results of these tests. Curve C is for a total bombarding time of eight minutes. Curve D is for a total time of two minutes. Curve E is for a total time of thirty seconds, and curve F is for a total time of six seconds. A single reading was taken at one-quarter second, and correspondingly high intensity. In this case, the reflection dropped from 50 per cent to 42 per cent.

Figure 5 shows that the greatest reduction in film thickness occurs when the exposure time is in the range from two minutes to thirty seconds. The total exposure was 175 watt-seconds per square inch for each of the above tests.

The test wedges which were bombarded for eight minutes and for two minutes showed no absorption. The intensity for these exposure times was, therefore, low enough to avoid chemical breakdown of the magnesium fluoride. The wedge which was bombarded for thirty seconds showed just a perceptible amount of absorption. The six-seconds test was quite dark, indicating a considerable amount of disintegration. All of the test films with the exception of the one-quarter second test were very hard and quite resistant to water. The one-quarter second film was quite soft and rubbed off with a pencil eraser.

It was observed that bombarded films which showed just a perceptible amount of absorption when taken from the jar, cleared up in a few hours and showed no absorption. It is assumed that the slight amount of metallic magnesium resulting from disintegration, later combined with oxygen in the air to form transparent magnesium oxide.

The effect of the voltage of the bombarding electrons was studied for applied potentials of 500 volts, 2,000 volts, 3,500 volts, 4,000 volts and 5,500 volts. A test with 500 volt electrons showed no improvement in film hardness and water solubility, even though the film was bombarded with an electron energy of 204 watt-seconds per square inch, and an exposure time of 180 seconds. When the anode voltage was 2,000 volts and the electron energy was 360 watt-seconds per square inch, there was a definite improvement in hardness and a reduction in the effect of water on the film.

The hardness and durability continued to improve for 3,500 and 4,000 volts. At 5,500 volts, the hardness was only slightly greater than for 4,000 volts. It was concluded that most of the desirable effect of electron bombardment of ¼ wavelength films of magnesium fluoride could be obtained with 5,000 volt electrons. The exposure, or product of intensity and time, should be just under the value required to cause chemical breakdown and an exposure time in the range between two minutes and a half minute was found to be quite satisfactory.

After many tests, it was concluded that disintegration of the magnesium fluoride molecules is due to the combined action of electron bombardment and surface temperature. In order to prove this point, a magnesium fluoride film was bombarded with an electron exposure (product of time and intensity) just under that required for disintegration. The test wedge was then allowed to cool in the vacuum for fifteen minutes, and it was then given another dose of electron bombardment equal to the first. The glass then cooled for fifteen minutes more in the vacuum and a third dose was given. When the test wedge was taken from the jar, the film had just a perceptible amount of absorption and this cleared up in less than an hour. Previous tests showed that if this intensity of bombardment had been applied in a single dose of three times the duration of those given above, or, if three times the intensity had been applied for the same time, the film would have been badly darkened by disintegration.

It might at first be supposed that the hardening action on magnesium fluoride films produced by electron bombardment is produced by temperature, and that the electrons merely serve to heat the surface of the glass. It can be shown that this is not the case, and that electron bombardment acts in a different way to produce durable films. It is believed that this action is produced by the impact of the electrons upon the molecules of the film and by known ability of electrons to penetrate beyond the surface of a material.

The surface temperature developed by a fixed rate of energy absorption, and the temperature distribution within a semi-infinite solid were calculated by the method of Fishenden and Saunders as outlined in "Applied Mathematics in Chemical Engineering" (pp. 241-245) by Sherwood and Reed. It was found that the surface temperature:

$$t = 0.208 W \sqrt{\frac{\Delta \theta}{KCP}} \quad (1)$$

and $$x = \sqrt{\frac{2K\Delta\theta}{CP}} \quad (2)$$

where $t$ = surface temperature °C.
$W$ = energy entering the surface in watts/sq. cm.
$\Delta\theta$ = the chosen increment of time in seconds
$\Delta X$ = the corresponding increment of distance from the surface in cm. (calculated from (2))
$K$ = thermal conductivity in calories cm./sec./sq. cm./°C.
$C$ = specific heat in calories/gram/°C.
$P$ = density in grams/cu. cm.

For crown glass this becomes:

$$t = 6.43 W \sqrt{\Delta\theta} \text{ in °C.} \quad (3)$$

and $$\Delta X = 0.1094 \sqrt{\Delta\theta} \text{ in cm.} \quad (4)$$

Figure 6 shows curves of temperature distribution in a semi-infinite solid of crown glass when its surface is bombarded at the rate of 175 watt-seconds per square inch. The curves for bombardment times of six seconds, thirty seconds and 120 seconds are shown. These bombardment times and the rate of bombardment are the same as three of the tests described earlier and shown in Figure 5. It will be seen from Figure 6 that the surface temperature rise for six seconds bombardment is 71° C., referring to curve K. For thirty seconds, curve L, the temperature rise is 31.7° C. and for 120 seconds, curve M, the temperature rise is 15.8° C. Although these curves are for a semi-infinite solid, the values of surface temperature would not be appreciably different for a crown lens having a thickness of 1 cm.

It is quite apparent from the above curves that the surface temperature produced by the electron bombardment values given is not sufficiently high to produce any appreciable hardening due to temperature alone. The high temperature method of hardening magnesium fluoride films in common use at the present time calls for heating the glass to about 225° C. prior to evaporating the film of magnesium fluoride. For the case of a 12" diameter bell jar and a lens plate 7½" diameter, this method requires about 600 watts of radiant heat applied for about fifteen minutes. This amounts to 13,500 watt-seconds per square inch as compared to about 350 watt-seconds per square inch required to bombard electronically both surfaces of a plate of glass about 0.1" thick. If a crown glass lens 1 cm. thick is bombarded on each surface for thirty seconds at a rate of 175 watt-seconds/sq. in., the temperature of the lens would rise by less than 30° C. This is low enough to make it quite practical to apply the electronic hardening method to cemented doublets. The hardness of magnesium fluoride films (given the treatment described above) is at least equal to, and possibly greater than that produced by the high temperature method.

In accordance with the above disclosed method of increasing the durability of magnesium fluoride films by bombarding them with electrons in the same vacuum in which the films are evaporated, it is pointed out that for maximum effect the electron exposure should be just under the value required to cause disintegration of the magnesium fluoride. The efficient application of this method requires that a sizable lens plate carry a plurality of optical objects to be coated and bombarded uniformly with electrons. If it were practical to project a continuous beam of electrons of sufficient intensity and uniformity over the whole area of the lens plate, this would be a desirable way of bombarding the lens surfaces. It is, however, very difficult to project a uniform electron beam of desired characteristics over a large area.

Figures 8, 9:
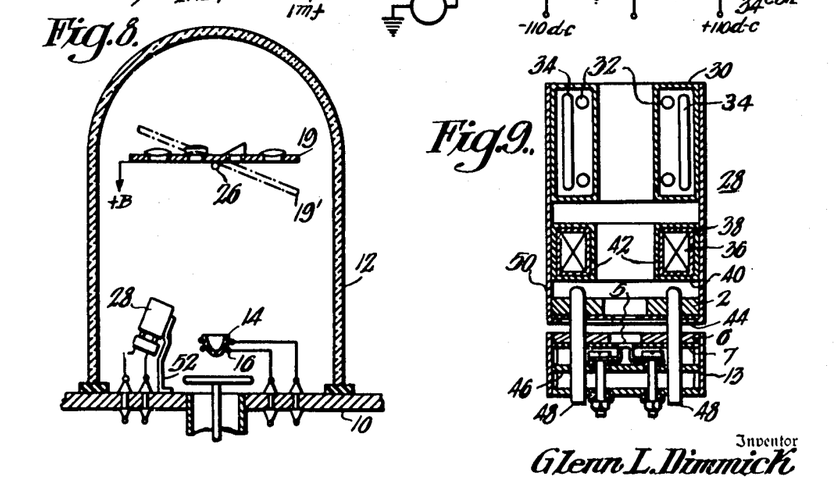
Figure 8 is a side elevation view of vacuum apparatus embodying a preferred form of the invention.
Figure 9 is a side elevation view in section of an electron gun, shown schematically in Figure 8 in miniature, approximately half size.

In some treatments electron bombardment can best be accomplished by scanning the lens plate several times per second with a high intensity beam of relatively small size. In the scanning method, it is desirable to have an electron gun capable of focusing several hundred watts of electron energy into a spot approximately ¼" diameter. Associated with the gun are means capable of deflecting this beam in two directions at right angles. Figures 8 and 9 show the electron gun 28 which was built and used successfully with improved results in electron bombardment of evaporated films. Referring to Figure 9, a hermetically-sealed cylindrical shell 30 contains the slow-speed deflecting coil 32 and the high-speed deflecting coil 34. A focusing coil 36 is enclosed in a hermetically-sealed cylindrical shell 38 and is surrounded by an iron shell 40, except for a small gap 42. The deflecting coils are similar to those described in Patent 2,167,379 by W. A. Tolson. Spiral scanning as in Nicolson 1,470,696 may be used, or mechanical means may be employed for scanning, as by oscillating the electron gun bodily in one plane while it is moved in a direction at right angles more slowly.

The anode apertured disc 44 is preferably made of molybdenum and has a circular hole in the center. The apertured member 6 is made of stainless non-magnetic steel, and has a ⅜" diameter hole in the center. Disc 7 is similar in nature to disc 7 in Figure 2. The member 6, which may be .116" thick, acts as an electron condenser for the electrons emitted from the cathode 5. The cathode 5 is made of .090" x .005" tantalum ribbon and presents a rectangular area ⅛" x .090". The cathode support structure 46, apertured structure 6, and disc 7 are held in a brass shell 13 and are insulated from the anode 44 by the insulators 48. The deflecting coils 32 and 34, the focusing coil 36 and the apertured anode 44 are mounted in a copper shell 50 which helps to conduct the heat down a pair of copper feet 52 (Figure 8) which are fastened to the metallic base plate 10 in the bell jar.

In operation, the electrons emitted from the tantalum cathode are concentrated by the aperture of the member 6 to such extent that they pass through the aperture of anode 44 and 2 without hitting it. The magnetic focusing coil 36 will then focus an image of the cathode or the image of the virtual "cross-over" upon the lens plate 19 in Figure 8. The image of the virtual "cross-over" is considerably smaller and more concentrated than the image of the cathode.

Figure 10:
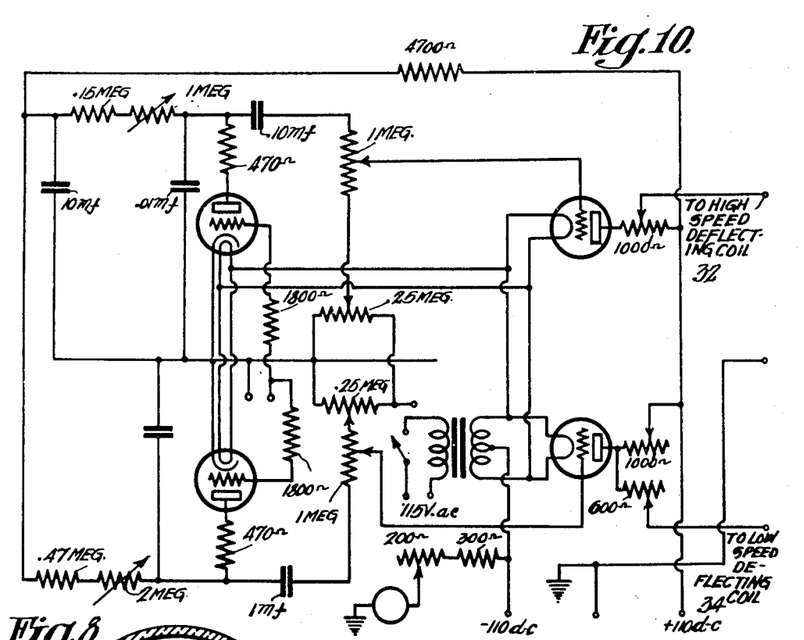
Figure 10 is a circuit diagram of the scanning system for the electron gun in Figures 8 and 9.

Figure 8 shows how the electron gun 28 is mounted with respect to the evaporating boat 14 and the lens plate 19. The electron beam is caused to scan the entire lens plate several times per second for the required length of time. This is accomplished by connecting the deflecting coils of the gun to a pair of saw-tooth oscillators, the circuits of which are shown in Figure 10. In order to prevent "streaks," it is desirable to impress a saw-tooth frequency of 400 cycles/sec. or higher on one set of deflecting coils and a saw-tooth frequency of from two to ten cycles per second on the other set of deflecting coils. The diameter of the electron spot at the lens plate was about ¼" in the test apparatus. It is not easy to keep the electron image in good focus all over the whole lens plate in view of the different angles involved, but this is of little practical importance, so long as the plane of plate 19 is substantially normal to the mean electron path, as shown in the inclined position 19'. The support plate is first positioned as shown at 19 for receiving the evaporated coating from boat 14 which is positioned in coaxial or perpendicular relation with plate 19. After the coating has been accomplished, the plate is rotated about its axis of support 26 to position 19' in perpendicular relation to the axis of the electron gun 28. The glass parts are bombarded with electrons as described above. The plate is then rotated to a position of 180° relative to position 19 to coat the other sides of the optical articles, thence to a position 180° from position 19' for bombardment. Alternatively, both sides of the articles may be coated in succession, followed by bombardment. These movements may be controlled by magnetic means disposed within and without the jar (not shown).

The bombarding exposure necessary for the desired hardening effect is a function of the material of the optical body, the thickness of the body. It has been found that a half wavelength coating requires a different treatment than does a quarter wavelength coating. For example, a ½ wavelength coating has been hardened by steps, depositing a ¼ wavelength coating followed by electron bombardment, then depositing the remaining ¼ wavelength coating, followed by bombardment. Forming a ½ wavelength coating in one step, followed by bombardment requires a still different treatment as to voltage and/or exposure.

The hardening action of electrons on magnesium fluoride films was shown to be approximately proportional to "exposure," or the function of time, velocity, and density. The term "intensity" is applied to the velocity and density of the electrons. If the electron beam (normally ¼" in diameter) is out of focus at some point on the lens plate and is actually ½" in diameter, then the intensity will be reduced, but the time of bombarding any point is increased and the total number of electrons falling on any given area during the total time will be practically the same. In practicing the invention, the desired hardness and durability of film has been effected by electron bombardment in less than ten minutes. The exposure, therefore, remains substantially uniform. It is desirable that the power and kinetic energy in the electron beam be constant and not be changed by the deflecting means.

The gun shown in Figure 9 meets this requirement. This electron gun will project more than 1,000 watts in an electron beam ¼" or less in diameter when the potential difference is 5,000 volts. As a matter of comparison, a normal cathode ray tube used in television uses a beam of around 5 watts power. Preferably, the cathode is made negative 5,000 volts and the anode is at ground potential.

Tests were made to determine the permissible tolerance in bombarding exposure for hardening ¼ λ magnesium fluoride evaporated films. It was found that exposures between 178 and 357 watt-seconds per square inch gave films which were, for all practical purposes, equally hard.

In order to determine the effect of the rate at which the electron energy is applied to the film, an exposure of 268 watt-seconds per square inch was applied to three samples using 25, 50, and 75 milliamperes, respectively, of electron current. It was found that the rate of bombardment did not affect the hardness of the film. While this was true for the range of currents indicated, it is probably not true for all rates of bombardment.

Tests were made to determine how the hardness of λ/4 electronically bombarded films is affected by the kind of glass on which the films are evaporated. Samples of glass having indexes of refraction of 1.523, 1.541, 1.572 and 1.700 were coated and bombarded under identical conditions. After being removed from the jar and rubbed with a chamois, they were each given the eraser test. None of the samples showed scratches. When tested with the eraser after soaking in distilled water for 16 hours, the spectacle crown glass (index 1.523) was the hardest, and the hardness decreased with the samples as the index of refraction increased.

The above tests have uncovered some very important facts, in connection with the practical importance of electron bombardment as a means of hardening magnesium fluoride films. They offer further evidence that the hardening of magnesium fluoride films is not the natural and expected result of electron bombardment. In order to obtain the desirable hardening effect, the electron exposure must be held between prescribed limits. The size of the electron spot and the rate of scanning must be held between limits in order to prevent the instantaneous surface temperature from becoming high enough to cause disintegration of the magnesium fluoride. The surface of the film must also be treated in a prescribed manner following bombardment. These factors are all essential to my new method of hardening magnesium fluoride.

Electron bombardment may, therefore, be used first for cleaning the optical surface, and finally for treating the film. While electron bombardment, according to a preferred embodiment of the invention, has been disclosed for treating films formed by thermal evaporation, it may be used in treating films formed in other ways.

The advantages of the electronic bombarding method are listed below:

1. The process may be applied to cemented doublets. This greatly simplifies the procedure for applying low reflecting coatings to finished optics. The high temperature method requires that doublets be coated on one side each before cementing. This increases the cost and cuts down the number of finished lenses per bell jar load.

2. The lower temperature resulting from the electronic process produces much less strain in the glass. After lenses or prisms have been carefully ground and polished to very precise curved or plane surfaces, it is a very decided disadvantage to have to heat these optics to 225° C. and cool them rapidly. This temperature may even cause a slight change in the index of refraction of some glasses.

3. The electronic process does not interfere with obtaining a satisfactory vacuum in the shortest possible time. When the metal and glass parts inside the bell jar are heated to 225° C. they give off much gas and it requires more time to obtain a satisfactory vacuum. This materially increases the cost. It is usually necessary to make a compromise between the degree of vacuum and the pumping time. If the compromise is in the direction of poorer vacuums, then the film will be softer and part of the gain in hardness possible with the high temperature method is sacrificed.

4. The electronic method of hardening ¼ wavelength magnesium fluoride films may be applied either during evaporation or after the film has been completed, without appreciably affecting the result. The only requirement is that the treatment be applied in the same vacuum in which the evaporation is done. It is simpler, from the operating standpoint, to apply the hardening process after the film is completed. The operator coats the glass parts in the normal way and then presses a button, which starts the bombardment and allows it to continue for a fixed time. This can be done automatically. The glass is then turned over by magnetic or other means and the process is repeated. No further baking is required after the glass is taken from the jar. The glass is not too hot to handle and may be immediately taken from the mounts. This saves cost of more mounts.

5. Electronic bombardment is a very excellent means of cleaning glass just prior to coating. The use of ionic bombardment of glass for cleaning is well-known, and generally used. The gas in the bell jar is ionized by applying several thousand volts between electrodes during the normal pumping cycle. The disadvantage of this method is that ionic bombardment stops as soon as a dark vacuum is obtained. This occurs at about 2 microns and it ordinarily takes from five to ten minutes or more to pump the jar down from this point to about 0.1 micron. During this time, oil vapor or other vapors collect on the surface of the glass and reduce the adhesion of the evaporated film. Electronic bombardment may be applied just prior to coating and is a most effective way of cleaning oil vapor or other contamination from the glass.

6. Electronic bombardment is useful in treating non-reflecting films deposited by thermal evaporation upon plastic lenses and the like, made for example of nitrocellulose, cellulose acetate or polymethyl methacrylate, or similar materials that would be deleteriously affected by heat necessary to harden the film.

7. Electron bombardment in accordance with the invention has a similar advantage, when used to harden and make more durable a half-wave coating of magnesium fluoride or the like, on front-surface optical mirrors of thermally deposited aluminum or silver.

Other advantages and uses will become apparent to those skilled in the art. While preferred embodiments of the invention have been shown, it will be apparent that the invention is not limited to such embodiments.

I claim as my invention:

1. A method of depositing a film of magnesium fluoride surface of a body in an evacuated chamber which comprises treating the surface before deposition of the film thereon by applying a potential to electrodes within the chamber and providing a thermal source of electrons in the chamber while holding the pressure within the chamber at about 0.1 to 0.2 micron, bombarding said surface with a stream of electrons from said source and thereafter depositing the film on the surface in the evacuated chamber.

2. A method according to claim 1 wherein the electrons issuing from said source are focused to a beam and scanned across said surface to provide substantially uniform exposure of each unit area.

3. A method of depositing a thin film of magnesium fluoride on a surface of a body in an evacuated chamber by thermal evaporation which comprises the steps of bombarding the surface with a stream of electrons while maintaining the pressure in the chamber at about 0.1 to 0.2 micron and immediately thereafter and under substantially the same pressure evaporating and depositing the magnesium fluoride on the surface.

4. The method of depositing a film of magnesium fluoride on a surface of a body in an evacuated chamber by thermal evaporation which comprises evacuating the chamber to a pressure of about 0.1–0.2 micron, creating and maintaining an electrical discharge within the chamber by applying a potential to electrodes in the chamber and providing a thermal source of electrons in the chamber and immediately after the discharge treatment evaporating and depositing a film of the magnesium fluoride on the surface within the chamber.

5. A method of depositing a thin film of magnesium fluoride on a surface of a body in an evacuated chamber by thermal evaporation which comprises evacuating the chamber to a pressure of about 0.1 to 0.2 micron, subjecting the surface to an electrical discharge by applying a potential to electrodes in the chamber and providing a thermal source of electrons in the chamber, whereby said surface is bombarded with a stream of electrons, and immediately after the discharge vaporizing the magnesium fluoride so that it is condensed on the surface.

6. The method of depositing a film of magnesium fluoride by thermal evaporation on a surface of a body held by a carrier in an evacuated chamber which comprises subjecting the surface to electronic bombardment by electrically charging the carrier with a potential of 2,000–6,000 volts and providing a thermal source of electrons in the chamber while maintaining the pressure in the chamber at about 0.1–0.2 micron and immediately thereafter evaporating the magnesium fluoride so that it is condensed on the surface.

7. The method of depositing a film of magnesuim fluoride on an optical surface of a body in an evacuated chamber by thermal evaporation, which comprises subjecting said surface to electron bombardment while maintaining the pressure in the chamber at about 0.1 to 0.2 micron, evaporating the magnesium fluoride and continuing the bombardment during at least part of the time the material is being evaporated and condensed on said surface.

8. The method of depositing a film of magnesium fluoride by thermal evaporation on an optical surface of a body held by a carrier in an evacuated chamber, which comprises subjecting the surface to electron bombardment by electrically charging the carrier with a potential of 2,000–6,000 volts and providing a source of electrons in the chamber while maintaining the pressure at about 0.1 to 0.2 micron, evaporating said magnesium fluoride and continuing the bombardment during at least part of the time the material is being evaporated and condensed on the surface and for ¼ second to 8 minutes after a film of the desired thickness has been deposited on said surface.

9. The method of depositing a film of magnesium fluoride on an optical surface of a body in an evacuated chamber, comprising maintaining the pressure within said chamber at about 0.1 to 0.2 micron, depositing a λ/4 thick coating of said magnesium fluoride on said surface by thermal evaporation and subjecting said coating to electron bombardment at 2,000–6,000 volts.

10. The method of coating an optical surface of a body with an interference coating of magnesium fluoride, comprising maintaining the pressure within said chamber at about 0.1 to 0.2 micron, depositing said coating of magnesium fluoride on said surface by thermal evaporation and subjecting said coating to electron bombardment for a period of time of from ¼ second to 10 minutes.

11. A method according to claim 10 in which said electron bombardment is produced by scanning a beam of electrons across said surface whereby a substantially uniform exposure is accomplished.

12. A method of depositing a film of magnesium fluoride on a surface of a body in an evacuated chamber, comprising exposing said surface to an ionic glow discharge, reducing the pressure within said chamber to about 0.1 to 0.2 micron, bombarding said surface with a stream of electrons and depositing said film upon said surface by thermal evaporation.

13. A method according to claim 12 which includes bombarding said magnesium fluoride with a stream of electrons while it is being deposited on said surface.

14. A method according to claim 13 which includes bombarding said film, after deposition, with a stream of electrons.

15. A method of depositing a multi-layer interference coating of magnesium fluoride on an optical surface of a body, comprising exposing said body to a pressure of 0.1 to 0.2 micron, evaporating and depositing said coating in a plurality of separate layers and bombarding each layer with a stream of electrons.

16. A method of forming an interference coating of magnesium fluoride on an optical surface of a body, comprising depositing said coating on said surface in vacuum, subjecting said coating to electron bombardment at a pressure of about 0.1 to 0.2 micron, raising said pressure to atmospheric pressure and filling the surface pores of said coating with a water repellent film-forming material from the class consisting of oils, fatty acids and waxes.

17. A method of depositing a film of magnesium fluoride on an optical surface of a body in an evacuated chamber, which comprises maintaining the pressure within said chamber at about 0.1 to 0.2 micron, depositing said film on said surface by thermal evaporation and condensation, and subjecting said coating to bombardment with a focused beam of electrons, said bombardment being conducted in a series of intermittent steps.

GLENN L. DIMMICK.

REFERENCES CITED

The following references are of record in the file of this patent:

UNITED STATES PATENTS

| Number | Name | Date |
| --- | --- | --- |
| 2,207,656 | Cartwright et al. | July 9, 1940 |
| 2,239,642 | Burkhardt et al. | Apr. 22, 1941 |
| 2,282,677 | Rayton | May 12, 1942 |
| 2,322,613 | Alexander | June 22, 1943 |
| 2,391,595 | Richards et al. | Dec. 25, 1945 |
| 2,394,930 | McRae | Feb. 12, 1946 |
| 2,420,724 | Rice | May 20, 1947 |

FOREIGN PATENTS

| Number | Country | Date |
| --- | --- | --- |
| 538,274 | Great Britain | July 28, 1941 |

Patent No. 2,465,713

Certificate of Correction

March 29, 1949

GLENN L. DIMMICK

It is hereby certified that error appears in the printed specification of the above numbered patent requiring correction as follows:

Column 14, line 42, after the word "fluoride" insert *on a*; and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*